Oct. 15, 1957   E. L. DAVEY   2,810,010
ELECTRIC CABLE JOINTS
Filed April 5, 1956   2 Sheets-Sheet 1
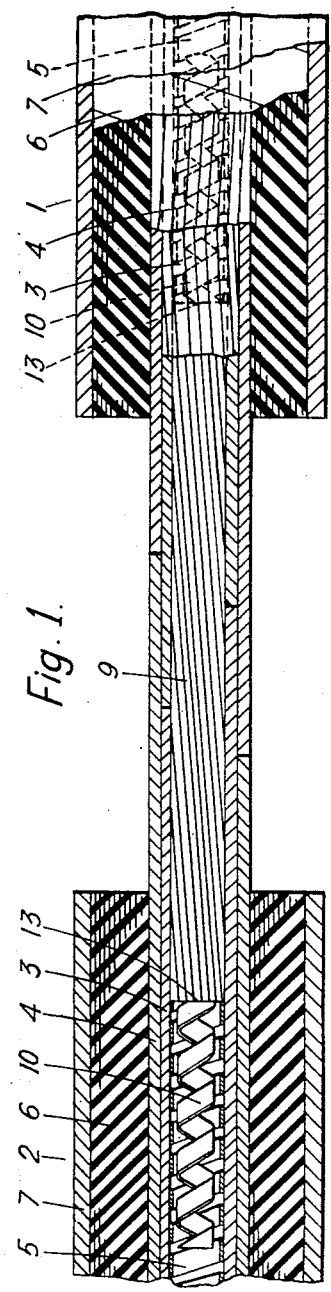
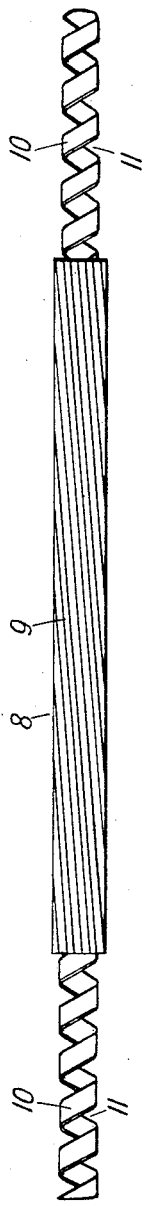
Inventor
Edward Leslie Davey
By Hoopes Leonard & Buell
Attorneys

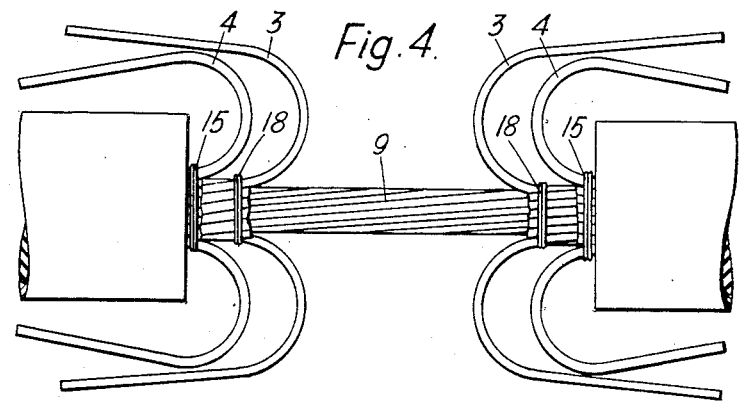
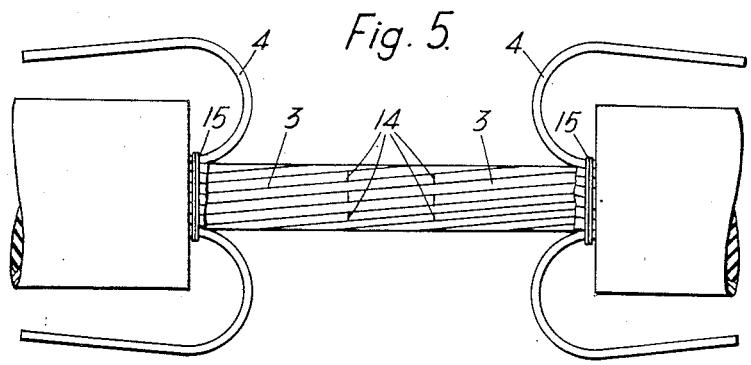
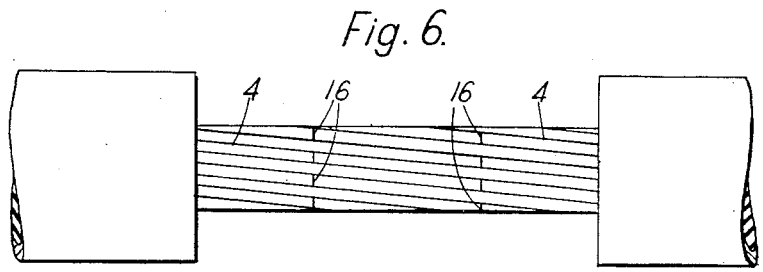

United States Patent Office 2,810,010
Patented Oct. 15, 1957

2,810,010

ELECTRIC CABLE JOINTS

Edward Leslie Davey, Hale, England, assignor to British Insulated Callender's (Submarine Cables) Limited, London, England, a British company Application April 5, 1956, Serial No. 576,450

Claims priority, application Great Britain April 12, 1955

4 Claims. (Cl. 174—88)

This invention is concerned with flexible joints in electric power cables having a stranded wire conductor formed with a central duct for the passage of gas or liquid under super-atmospheric pressure.

In making such joints, the machine-applied conductor dielectric is removed from the ends of the two lengths to be jointed and the component wires of the conductors of one of the two lengths are brazed to the corresponding wires of the conductor of the other length. After jointing the conductor in this way insulation is applied over the conductor joint and finally a joint is made between the sheath of one length and that of the other length as by means of a length of sleeving.

We have found that the thermal stability of such flexible joints as hitherto constructed is lower than that of the cable itself due to the additional $I^2R$ loss introduced by the brazed joints in the conductor wires, the tendency of the dielectric loss of the joint insulation to be higher than that of the factory applied insulation and the fact that the thermal resistance of the joint insulation is higher than that of the insulation of the cable itself.

It is an object of this invention to provide an improved form of flexible joint of which the thermal stability is at least as high as that of the cable itself.

In accordance with my invention my improved flexible joint includes an insertion piece consisting of a central support in the form of an open helix a central part of which supports and is enclosed by a layer of wires extending in a helical direction. This insertion piece is located in the ends of the two lengths of hollow conductor, its central part having an external diameter corresponding to the external diameter of the open helix about which the wires of each of the two lengths of cable conductor are stranded in one or more layers. Preferably the lay of the wires of the insertion piece and that of the neighbouring layers of wires of the lengths of cable conductor are of the same hand.

Without materially increasing the stiffness of the conductor joint, this insertion piece considerably increases its electrical conductivity, so that the $I^2R$ loss/unit length of conductor at the joint is so much less than that in the cable itself that the thermal stability of the joint is on a plane at least as high as that of the cable.

In making my improved flexible joint, the component wires of the conductor of each cable length are turned back, layer by layer and in each cable length the open helix supporting the conductor wires is forced back inside the conductor for a short distance. The projecting ends of the supporting helix of the insertion piece are inserted in the supporting helix of the cable conductor and the ends of the central part of the insertion piece inserted in the ends of the conductor lengths to an extent to cause the ends of its wires to abut the ends of the supporting helices and to leave the middle of the central part of the insertion piece exposed. The wires of the inner layer of one conductor length are then laid back on the insertion piece, one by one, and butted and brazed to those of the conductor length, the brazed joints in neighbouring wires being longitudinally staggered with respect to one another. The wires of the outer layer, if any, are similarly treated, the brazed joints in this layer being longitudinally staggered also with respect to those of the inner layer. The jointed conductor is then insulated in a manner appropriate to the factory applied insulation on the cable itself.

A joint constructed in accordance with the invention is described hereinafter by way of example and with reference to the accompanying diagrammatic drawings wherein:

Figure 1 is a longitudinal sectional view of the point;

Figure 2 is a side view of an insertion piece such as is used in the joint which is shown in Figure 1;

Figure 3 shows an alternative form of insertion piece; and

Figures 4, 5 and 6 represent three successive stages in the forming of the joint shown in Figure 1.

The cables 1 and 2, the ends of which are to be joined together (as illustrated in Figure 1) each comprise a hollow stranded wire conductor consisting of an inner layer 3 and an outer layer 4 of copper wires. The inner layer 3 is stranded about a central supporting open-turn helix 5 of steel strip. The wires of the inner layer 3 are stranded with a left hand lay (as appears in Figure 5) and those of the outer layer 4 with a right hand lay (as appears in Figure 6). The conductor is enclosed in a body 6 of dielectric material and an outer sheath 7. This is a known form of cable, its construction forming no part of the invention; the dielectric material 6 will usually consist of a body of concentric layers of paper impregnated with gas and/or liquid, and the sheath 7 will usually be of lead with one or more external reinforcing and protective layers appropriate to the circumstances in which the cable is to be used.

The insertion piece (Figure 2) which is to be used to connect the cable conductors comprises a cylindrical central portion 8 of copper wires 9 stranded in a single layer about an open turn helix 10 of steel strip of which the two end parts 11 extend beyond the ends of the central portion 8. The direction of lay of the wires 9 is left-hand, that is in the same sense as the direction of lay of the wires 3 of the inner layer of the cable conductor. The external diameter of the central portion 8 is substantially the same as the external diameter of the central helix 5 of the cable. The external diameter of the steel helix 10 of the insertion piece is somewhat less than the internal diameter of the central helix 5 of the cable, to enable the end parts 11 of the former to be inserted within the latter.

The insertion piece is preferably cut from a long length of hollow conductor which is made by stranding a layer of wires 9 about an open metal helix 10. Short pieces of appropriate length are then cut from the long length, and the ends of the short pieces are trimmed to set back the ends of the central portion 8 of the layer of wires 9 so as to expose the ends 11 of the central helix 10. In order to retain the component wires of the central portion 8 in position, the wires 9 are tinned and then soldered together. All excess solder is removed and the circumferential edges at the ends of the portion 8 are conveniently chamfered. In an alternative arrangement, shown in Figure 3, the wires 9 of the central portion 8 are bound together by two rings 12, each located towards one end of the portion. Each ring 12 is made by wrapping thin metal tape about the wires 9 and securing the tape by brazing or soldering. The rings 12 are spaced apart by a distance which is preferably equal to, or greater than, the length of lay of the wires 9 so that the flexibility of the insertion piece is substantially unaffected. The rings 12 will be applied to the long manufactured length from which the insertion piece is cut.

The improved flexible joint is made in the following manner. The sheath 7 and insulation 6 are cut back at the end of each cable 1 and 2 to expose an appropriate length of each cable conductor. The wires of each layer 3 and 4 of the conductors are then turned outwards and backwards, as shown in Figure 4. Temporary wire binders 15 are applied about the outer layer of wires 4 and similar binders 18 about the inner layer of wires 3, to hold the wires together behind the points of bending. In each cable end the open helix 5 is forced back inside the cable conductor, as shown in Figure 1. The projecting ends 11 of the supporting helix 10 of the insertion piece are inserted one each end of the cable conductor supporting helices 5. The ends of the central portion 8 of the insertion piece are inserted in the ends of the cable conductors to an extent to cause the ends of the wires 9 to abut the ends of the cable conductor supporting helices 5, as at the positions 13 shown in Figure 1. The middle of the central portion 8 of the insertion piece is, at this stage, exposed between the two cable ends as shown in Figure 4. The wires 3 of the inner layers of the conductor of one cable are then turned back on to the insertion piece, one by one, and butted and brazed to the corresponding wires 3 of the adjacent conductor length. The wires 3 are appropriately trimmed to provide for the brazed points 14 in neighbouring wires being longitudinally staggered with respect to one another. The inner two temporary wire binders 18 are removed and the joint is now in the condition shown in Figure 5. The wires of the outer layers 4 of the cable conductors are now similarly treated, the brazed joints 16 between them being staggered in similar manner to that described for the inner layer and being also staggered with respect to those of the inner layer. The outer temporary binders 15 being now removed, the joint is in the condition shown in Figure 6, and it will be seen that the joints 16 between the outer wires 4 are spaced apart further than the joints 15 between the inner wires 3. The jointed conductor is then insulated in a manner appropriate to the factory applied insulation on the cable itself. The steps of the jointing process will be the same where the cable conductor comprises only one layer or more than two layers of wires. In the first case the conductor joint will be completed by connecting together the wires in the single layer such as the layer 3. In the other case, the outer layers of wires will be dealt with in a manner similar to that described above for the outer layer 4.

By way of example the following details are given of an insertion piece, such as is shown in Figure 2, suitable for making a flexible joint in a hollow conductor of 0.35 square inch (2.25 square centimetres) cross-sectional area, formed of 42 x 0.105 inch (0.27 centimetre) diameter. The wires are arranged as an inner layer 3 of 18 wires having a left-hand lay of length 10.15 inches (26.2 centimetres) and an outer layer 4 of 24 wires having a right hand lay of the same length. The inner layer 3 is applied about an open steel helix 5 of steel tape having an internal diameter of 0.47 inch (1.2 centimetres) and an external diameter of 0.53 inch (1.35 centimetres). The insertion piece includes an open wound helix of steel tape 10 having a length of 12 inches (30.5 centimetres), an internal diameter of 0.32 inch (0.8 centimetre) and an external diameter of 0.355 inch (0.9 centimetre). Symmetrically at the centre of this length of helix 10 there is applied, over a length of 7 inches, a single layer of 16 x 0.083 inch (0.21 centimetre) diameter copper wires 9, applied with a left hand lay of length 6.5 inches (16.5 centimetres) and an external diameter of 0.52 inch (1.32 centimetres).

What I claim as my invention is:

1. A joint between the ends of two electric cable conductors each of which consists of a layer of wires stranded helically about a central supporting helix, the joint including a central open-wound helix and an intermediate portion comprising a layer of wires extending helically about and supported by a central portion of the open-wound helix, the ends of said open-wound helix being located in the ends of the two conductor-supporting helices, said intermediate portion having an external diameter equal to the external diameter of said conductor-supporting helices and being located between the ends of those helices, the layer of wires of each cable conductor being laid helically around the intermediate portion, the end of each wire of one cable conductor abutting and being in brazed connection with the end of a corresponding wire of the other cable conductor, and the brazed connections in neighbouring wires being longitudinally staggered with respect to one another.

2. A joint between the ends of two electric cable conductors each of which consists of at least two concentric layers of helically extending wires and a central supporting helix about which the wires of the inner of the layers are stranded, the joint including a central open-wound helix and an intermediate portion comprising a layer of wires extending helically about and supported by a central portion of the open-wound helix, the ends of said open-wound helix being located in the ends of the two conductor-supporting helices, said intermediate portion having an external diameter equal to the external diameter of said conductor-supporting helices and being located between the ends of those helices, the inner layer of wires of each cable conductor being laid helically around the intermediate portion and each other layer of wires being laid helically around the next inner layer, the end of each wire in each layer of one cable conductor abutting and being in brazed connection with the end of the corresponding wire of the other cable conductor, the brazed connections in neighbouring wires in each layer being longitudinally staggered with respect to one another and the brazed connections in each layer being longitudinally staggered with respect to the brazed connections in any other of the layers.

3. A joint between the ends of two electric cable conductors each of which consists of a layer of wires stranded helically about a central supporting helix, the joint including a central open-wound helix and an intermediate portion comprising a layer of wires extending helically about and supported by a central portion of the open-wound helix, the wires of said intermediate portion being stranded in the same sense, and with the same length of lay, as the wires of each cable conductor, the ends of said open-wound helix being located in the ends of the two conductor-supporting helices, said intermediate portion having an external diameter equal to the external diameter of said conductor-supporting helices and being located between the ends of those helices, the layer of wires of each cable conductor being laid helically around the intermediate portion, the end of each wire of one cable conductor abutting and being in brazed connection with the end of a corresponding wire of the other cable conductor, and the brazed connections in neighboring wires being longitudinally staggered with respect to one another.

4. A joint between the ends of two electric cable conductors each of which consists of at least two concentric layers of helically extending wires and a central supporting helix about which the wires of the inner of the layers are stranded, the joint including a central open-wound helix and an intermediate portion comprising a layer of wires extending helically about and supported by a central portion of the open wound helix, the wires of said intermediate portion being stranded in the same sense, and with the same length of lay, as the wires of the inner layer of wires of each cable conductor, the ends of said open-wound helix being located in the ends of the two conductor-supporting helices, said intermediate portion having an external diameter equal to the external diameter of said conductor-supporting helices and being located between the ends of those helices, the inner layer of wires of each cable conductor being laid helically around the intermediate portion and each other layer of wires being laid helically around the next inner layer, the end of each wire in each layer of one cable conductor abutting and being in brazed connection with the end of the corresponding wire of the other cable conductor, the brazed connections in neighboring wires in each layer being longitudinally staggered with respect to one another and the brazed connections in each layer being longitudinally staggered with respect to the brazed connections in any other of the layers.

References Cited in the file of this patent

UNITED STATES PATENTS 2,536,294     Landis et al. _____ Jan. 2, 1951